United States Patent [19]

Amberg et al.

[11] Patent Number: 4,822,113
[45] Date of Patent: Apr. 18, 1989

[54] BRAKING TORQUE CONTROL SYSTEM

[75] Inventors: Robert L. Amberg, Seattle; Andrew M. Valaas, Bellevue, both of Wash.

[73] Assignee: The Boeing Company, Seattle, Wash.

[21] Appl. No.: 84,857

[22] Filed: Aug. 13, 1987

[51] Int. Cl.⁴ .............................................. B60T 8/58
[52] U.S. Cl. .............................. 303/100; 303/DIG. 2; 303/112; 364/426.02
[58] Field of Search .................... 188/181 T, 2 A; 303/103, 100, 102, 110, 112, 94, 95, 96, 98, DIG. 3, 42; 244/111; 364/426, 426.02

[56] References Cited

U.S. PATENT DOCUMENTS

| | | | |
|---|---|---|---|
| 2,781,871 | 2/1957 | Altekruse | 188/152 |
| 3,520,575 | 7/1970 | Steigerwald | 244/111 |
| 3,711,162 | 1/1973 | Steinbrenner et al. | 303/112 |
| 3,790,225 | 2/1974 | Wehde | 303/113 |
| 3,802,745 | 4/1974 | Strifler et al. | 303/3 |
| 3,825,308 | 7/1974 | Kasselmann et al. | 303/100 |
| 4,043,607 | 8/1977 | Signorelli et al. | 303/100 |
| 4,323,969 | 4/1982 | Skarvada | 364/426 |
| 4,336,592 | 6/1982 | Beck | 364/426 |
| 4,402,478 | 9/1983 | Martin | 244/111 |
| 4,412,291 | 10/1983 | Amberg et al. | 364/426 |
| 4,428,620 | 1/1984 | Warwick et al. | 303/DIG. 3 |
| 4,430,703 | 2/1984 | Saumweber et al. | 364/426 |
| 4,430,715 | 1/1985 | Gentet et al. | 364/426 |
| 4,494,199 | 1/1985 | Lehmann | 364/426 |
| 4,550,372 | 10/1985 | Kahrs | 364/426 |

FOREIGN PATENT DOCUMENTS 966208 4/1975 Canada ............................. 303/112
0062246 10/1982 European Pat. Off. .

Primary Examiner—George E. A. Halvosa
Assistant Examiner—Mark T. Le
Attorney, Agent, or Firm—Christensen, O'Connor, Johnson & Kindness

[57] ABSTRACT

A system for controlling the torque developed by a fluid actuated brake as it slows an aircraft wheel. In one embodiment, the system includes a strain gauge (62) for sensing the load applied to a brake metering valve (16). In another embodiment, the pressure of the hydraulic fluid output from the brake metering valve is sensed by a pressure transducer (42). Depending upon the sensor used, the system is operative to control the pressure applied to a brake assembly (54) of an aircraft as a function of the mechanical load or pressure. The system includes a torque control (50,120) connected to control one or more valves (22, or 83 and 102), modulating the pressure of hydraulic fluid applied to the brake assembly; the valves may be part of an antiskid control system. A torque sensor (46) is disposed on a torque reaction arm (36) and produces a signal indicative of the torque developed by the brake assembly. The torque control reduces the pressure of the hydraulic fluid applied to the brake assembly if the torque produced by the brake exceeds a value determined as a function of the magnitude of the force applied to actuate the brake.

35 Claims, 6 Drawing Sheets

BRAKING TORQUE CONTROL SYSTEM

TECHNICAL FIELD

The present invention generally pertains to a system for controlling the braking force applied to slow a rolling wheel, and more specifically, to a system for controlling the torque produced by a brake as it slows a wheel.

BACKGROUND OF THE INVENTION

The braking systems used on a large commercial aircraft must be capable of dissipating tremendous kinetic energy as the aircraft is slowed during landing, yet provide smooth control of the plane's speed while it is taxiing on the runway. These requirements represent different considerations in braking system design and choice of material used in the brakes, and present the brake design engineer with a difficult choice— to design a braking system optimized for slowing an aircraft traveling at high speed or a system offering smooth control.

For example, it is well-known that carbon brake materials are better able to withstand the heat build-up that occurs during landing when relatively high braking forces are applied to slow the aircraft. Furthermore, compared to steel brakes, carbon brakes provide a net reduction in airplane weight of as much as 1,600 pounds. However, carbon brakes are particularly susceptible to a significant variation in braking torque resulting from a given applied force. The torque may vary by a factor of up to 8 to 1, making it very difficult to smoothly control aircraft braking, especially at low taxiing speeds. The variation in the coefficient of friction of carbon brakes is a function of wheel speed, temperature, age, moisture and other factors. Of these factors, the variation in braking torque resulting from changes in wheel speed is perhaps the most significant. Like most other brake materials, carbon brakes tend to exhibit a much higher braking torque or coefficient of friction at lower wheel speeds, causing grabbing to occur when the brakes are applied at relatively low taxiing speeds. Due to complaints received from pilots concerning this problem, aircraft brake design engineers have been reluctant to specify carbon brakes.

In attempting to resolve this problem, brake pressure metering systems have been developed which incorporate a manual metering valve that has a lower pressure gain (the ratio of the force applied at the brakes relative to the force applied by the pilot on the brake pedal) at lower metering pressures than at higher metering pressures. The metering valve is intended to compensate for the higher brake torque developed at lower wheel speeds. However, the metering valve does not take into account the wide variations in braking torque that may occur, and which is most objectionable with respect to carbon brakes.

A device for controlling a braking system by sensing the actual torque exerted by the brake on a wheel is disclosed in U.S. Pat. No. 4,043,607. This device compares the torque developed by a brake against a predetermined value, and if the torque is greater than the value, actuates a servo control to reduce the torque accordingly. During the initial application of the brakes and during the time that the brake cylinders are filling with fluid, the servo control permits direct braking to occur. After the pressure of the fluid climbs to a predetermined level, the servo control is operative to limit the braking torque to a level determined as a function of the displacement of the brake pedal, according to one of two relationships or laws selected as a function of wheel speed. The brake control system described in this patent has several disadvantages. It does not include a mechanical metering valve and is not suitable for retrofit on an aircraft that uses a mechanical brake metering valve. Furthermore, in aircraft having an antiskid braking system, the antiskid control must inject an artificial over-torque signal into the torque limiting control circuit to effect an antiskid brake fluid pressure reduction. The combined antiskid and brake torque limiting control system is thus much more complicated, and it is impractical for this reason to retrofit an aircraft having an antiskid system with the prior art brake torque limiting servo control system described in this patent. Also, the characteristics of the individual servo valves used on the brakes of each wheel of a multiple brake landing gear must be closely matched to ensure that equal pressure is exerted at each wheel in response to the same control currents, to avoid imbalanced braking while operating in the open loop, direct control mode. Providing closely matched servo valves adds considerable cost to a brake control system of the type described in this patent.

Another torque limiting system is disclosed in U.S. Pat. No. 4,412,291. In this patent, a conventional mechanical metering system with antiskid valves is provided with a brake torque sensor and an electronic controller. The controller actuates the antiskid valves to reduce braking torque in response to the greater of a torque limiting signal and the antiskid control signal. The braking torque is limited only if it approaches a predetermined upper limit, which if exceeded, might damage the aircraft structure. The controller does not control braking torque during taxiing conditions and is not a solution to the unpredictable torque levels characteristic of carbon brakes.

SUMMARY OF THE INVENTION

Prior art brake control systems have not adequately solved the above-described problem associated with variations in braking torque, particularly with respect to carbon brakes. Accordingly, the present invention provides a system for controlling the torque developed by a fluid pressure actuated brake as it slows a rolling wheel. The system comprises means for producing a signal indicative of the magnitude of an operator-applied braking force and means for sensing the torque developed by the brake as it slows the rolling wheel and for producing a signal indicative of the torque. Pressure reducing means are provided in the brake hydraulic fluid circuit for reducing the pressure of the fluid actuating the brake in response to a control signal.

Control means connected to and responsive to both the signal indicative of the magnitude of the operator-applied braking force and the signal indicative of the torque developed by the brake produce a control signal that is input to the pressure reducing means. The control signal acts to reduce the fluid pressure actuating the brake if the torque developed by the brake exceeds a value determined as a function of the magnitude of the operator-applied braking force. In response to the second control signal, the pressure reducing means operate to reduce the pressure of the fluid actuating the brake.

In one embodiment of the present invention, the means for producing a signal indicative of the magnitude of the operator-applied braking force comprise a pressure transducer disposed so as to sense fluid pressure upstream of the means for reducing the pressure.

In a second embodiment, the means for producing a signal indicative of the magnitude of an operator-applied braking force comprise a load sensor disposed so as to sense a force applied to a fluid metering valve through which pressurized fluid is supplied to actuate the brake, upstream of the means for reducing pressure.

The difference between the torque developed by the brake and the determined value of the torque, or torque error, is computed by the control means, and the control signal is computed by the control means proportional to the torque error if the torque developed by the brake exceeds the determined value. In addition, the control means further include means for computing an integral and a derivative of the torque error, which are added to produce the control signal.

In another embodiment, the present invention is intended to be retrofit to an aircraft having an installed antiskid system. The means for reducing pressure comprise the antiskid pressure reduction valve and the control signal produced by the control means is input to the valve in parallel with the antiskid control signal.

DESCRIPTION OF THE PREFERRED EMBODIMENTS

Figure 1:
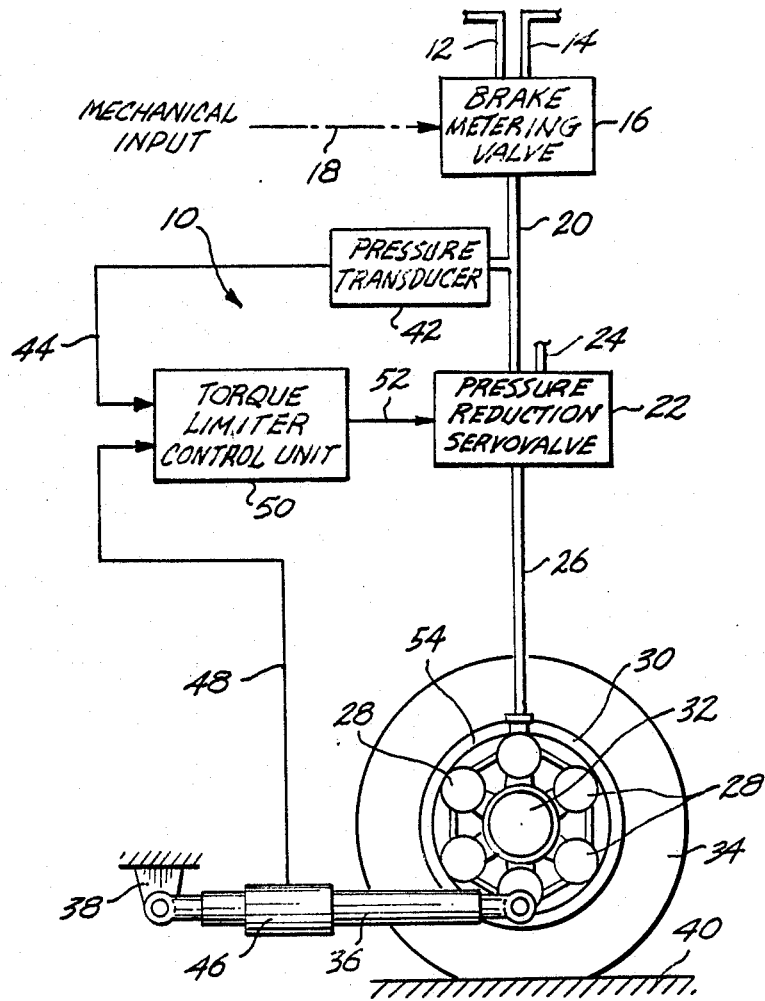
FIG. 1 is a block diagram illustrating a first embodiment of the present invention.

With reference to FIG. 1, a simplified block diagram schematically illustrates a braking system used on one of the wheels 30 of an airplane wherein a first embodiment of the present invention, generally denoted by reference numeral 10, is applied to control the torque developed by the brake as it slows the rolling wheel. As is typical of most aircraft braking systems, pressurized hydraulic fluid is supplied from a pump (not shown) through a hydraulic line 12 to a brake metering valve 16. The pilot controls brake metering valve 16 by applying a force through a mechanical linkage 18, e.g., by stepping on a brake pedal (not shown). Brake metering valve 16 is operative to modulate the pressure of the brake hydraulic fluid in a brake pressure line 20 in response to the braking action of the pilot, excess hydraulic fluid being returned to the hydraulic system reservoir (not shown) through hydraulic fluid return line 14. Since the braking force applied by the pilot directly controls the pressure in brake pressure line 20, either the mechanical load imposed on mechanical linkage 18 due to application of the brakes or the pressure of the fluid in brake pressure line 20 may be considered as indicative of the magnitude of the force applied to actuate the brake. This convention is followed throughout this specification and in the claims that follow.

Brake pressure line 20 is connected to a servo valve 22, which serves to control the pressure of the hydraulic fluid in order to control the torque produced by the brakes in accordance with the present invention. Excess hydraulic fluid returns to the hydraulic system from servo valve 22 through return line 24. The pressure controlled hydraulic fluid from servo valve 22 is in fluid communication with a brake assembly 54 comprising a plurality of brake cylinders 28. When actuated by the pressure of hydraulic fluid applied through brake actuator pressure line 26, pistons (not shown) inside brake cylinders 28 apply a force against a plurality of carbon brake disks (not shown), generating friction between the disks and brake rotors (also not shown), thereby slowing wheel 30. Wheel 30 rotates about an axle 32 and includes a generally conventional rubber tire 34, which rolls over a surface 40.

Brake assembly 54 is prevented from rotating with wheel 30 by a torque reaction arm 36, which extends between the brake assembly and an adjacent fixed support 38. As pressurized hydraulic fluid is applied to brake assembly 54 to slow wheel 30, the friction of the brake disks against the brake rotors exerts a rotational torque on the brake assembly that would cause it to rotate about axle 32 if not restrained by torque reaction arm 36. The torque developed by brake assembly 54 during the braking action is thus fully transmitted through torque reaction arm 36 to fixed support 38.

In the first preferred embodiment 10 of the present invention, a pressure transducer 42 is provided in fluid communication with brake pressure line 20 to sense the pressure of the hydraulic fluid in the line, which is indicative of the braking force applied by the pilot to slow the aircraft. Pressure transducer 42 produces an electrical signal corresponding to the magnitude of that force, which is conveyed over leads 44 and is input to a torque control 50.

Another input signal is developed by a torque sensor 46 disposed on torque reaction arm 36. Torque sensor 46 provides a signal indicative of the torque developed by brake assembly 54 as it slows the rotation of wheel 30, which is conveyed over leads 48 to torque control 50. A strain gauge or other device operative to sense the force developed along the longitudinal axis of torque reaction arm 36 as braking force is applied to wheel 30 may be used as a torque sensor.

In response to the signals provided by pressure transducer 42 and torque sensor 46, and in accordance with a control algorithm which will be explained in detail hereinbelow, torque control 50 is operative to produce a control signal that is conveyed over leads 52 to servo valve 22. The control signal produced by torque control 50 causes servo valve 22 to modulate the hydraulic fluid pressure in brake actuator pressure line 26 as applied to each of the hydraulic brake cylinders 28, thereby controlling the braking force (or torque) developed by brake assembly 54.

Figure 2:
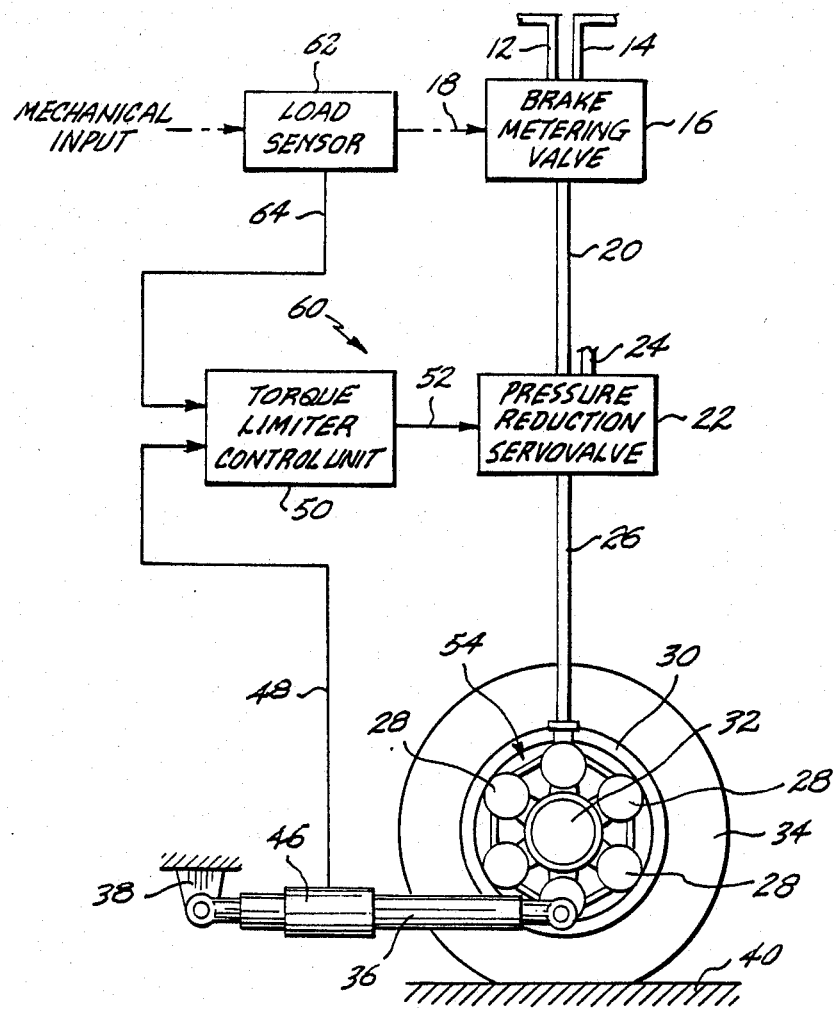
FIG. 2 is a block diagram illustrating a second embodiment of the present invention.

Turning now to FIG. 2, a second preferred embodiment of the present invention is shown, generally denoted by reference numeral 60. The second embodiment 60 is generally similar to the first embodiment 10, and the same reference numerals are used to indicate the elements that are common to both embodiments. The second embodiment 60 differs from the first embodiment 10 in that it does not include pressure transducer 42 to sense the pressure of hydraulic fluid in brake pressure line 20, but instead uses a load sensor 62 disposed on mechanical linkage 18 to sense the force applied by the pilot to actuate brake metering valve 16. Load sensor 62 may be a strain gauge or other device operative to sense the force applied through mechanical linkage 18 to brake metering valve 16. An electrical signal from load sensor 62 is conveyed through lead 64 as an input to torque control 50. Aside from the use of load sensor 62 in place of pressure transducer 42, the second embodiment 60 is substantially the same as the first embodiment 10.

Figure 3:
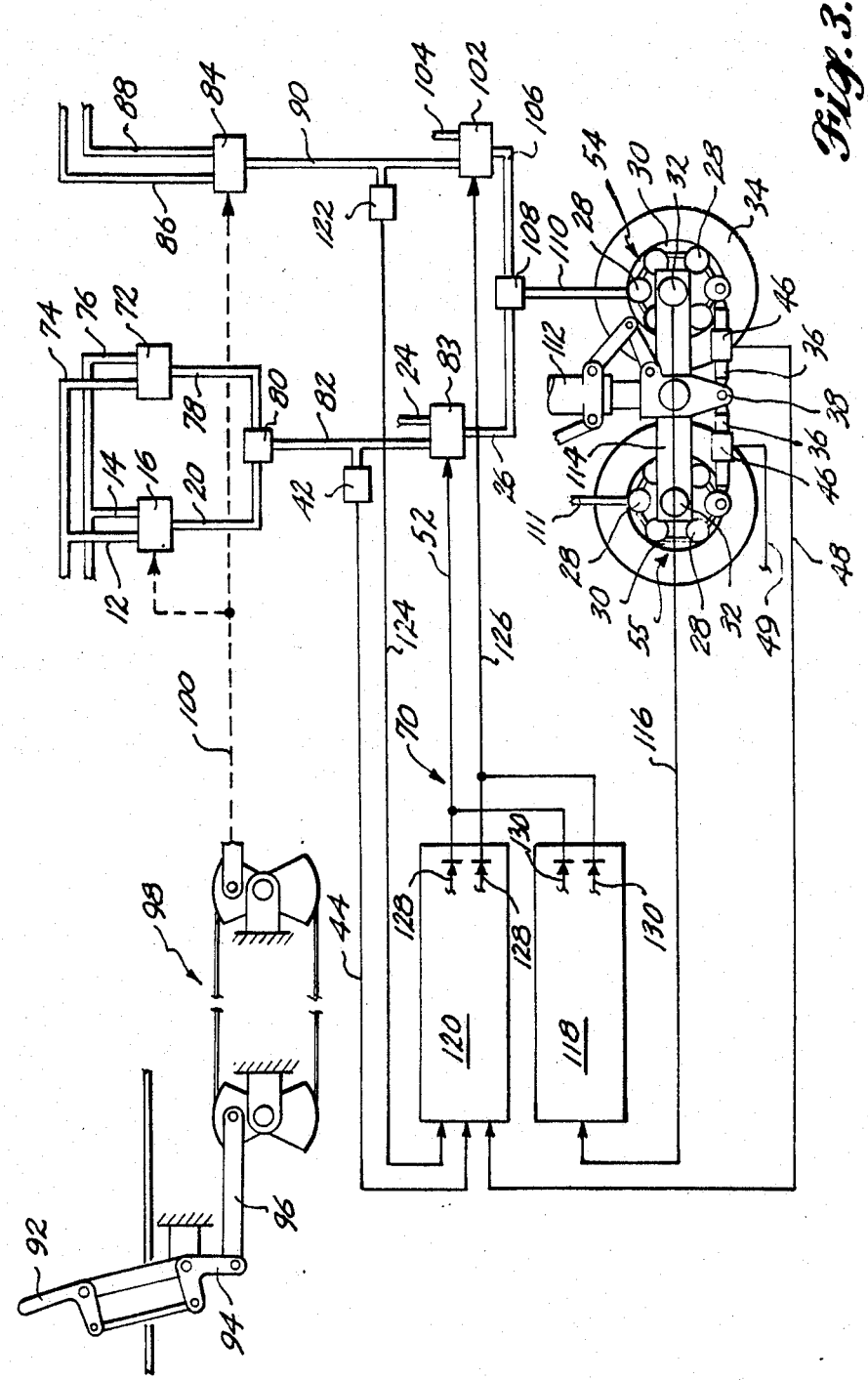
FIG. 3 schematically illustrates a further embodiment of the present invention as applied to an aircraft having an antiskid system.

A third more complex embodiment of the present invention, generally denoted by reference numeral 70, is shown in FIG. 3. Again, the same reference numerals are used to indicate elements which are common to each of the embodiments. As in the first embodiment 10, pressurized hydraulic fluid is supplied through a hydraulic line 12 to the brake metering valve 16. Brake metering valve 16 operates to modulate the flow of pressurized hydraulic fluid into brake pressure line 20 in response to a mechanical input corresponding to the action taken by the pilot of the aircraft in applying the brakes, and provided through mechanical linkage 100. The pilot applies the brakes by depressing a brake pedal 92, causing a bell crank 94 to pivot. Bell crank 94 is connected through a link 96 to a cable system 98, which transmits the braking action through mechanical linkage 100 to actuate brake metering valve 16.

The third embodiment 70 is applied to an aircraft having an automatic braking system, which includes an auto brake metering valve 72, supplied with pressurized hydraulic fluid through a supply line 74. Excess hydraulic fluid is returned to the reservoir (not shown) through a return line 76. Automatic brake metering valve 72 is controlled by a controller (not shown) in the aircraft to automatically modulate the pressure of hydraulic fluid in brake pressure line 78 and may be selectively activated by the pilot if he elects not to provide manual braking. However, the pilot may at any time manually apply braking in excess of the automatically applied braking. Brake pressure lines 20 and 78 are each connected as inputs to a shuttle valve 80. Shuttle valve 80 selects whichever of brake pressure lines 20 and 78 has the higher pressure, and provides fluid communication from the selected brake pressure line 20 or 78 into a brake pressure line 82. Hydraulic fluid is conveyed by brake pressure line 82 to an antiskid valve 83, having a return line 24 for conveying excess hydraulic fluid back to the system reservoir. Hydraulic fluid at a pressure modulated by antiskid valve 83 passes into brake actuator pressure line 26, which is connected to a shuttle valve 108.

An alternate or back-up braking system is also provided wherein pressurized hydraulic fluid is supplied to an alternate brake metering valve 84 through a supply line 86; excess hydraulic fluid is returned to the hydraulic system reservoir through a return line 88. The alternate brake metering valve 84 is also connected to mechanical linkage 100 and, therefore, is also responsive to the force exerted by the pilot on brake pedal 92. Hydraulic fluid at a pressure modulated by alternate brake metering valve 84 is output through a brake pressure line 90, in fluid communication thereby with an alternate antiskid valve 102. Alternate antiskid valve 102 has a return line 104 to convey excess hydraulic fluid back to the hydraulic system reservoir. Hydraulic fluid at a pressure modulated by alternate antiskid valve 102 is conveyed to shuttle valve 108 through alternate brake actuator pressure line 106. It will be apparent to those skilled in the art that the alternate brake system is redundant and is provided to ensure that the aircraft may be stopped in the event that a failure occurs in the "normal" brake system.

Shuttle valve 108 functions in a manner similar to shuttle valve 80, selecting brake actuator pressure line 26 or alternate brake actuator pressure line 106 as an input, depending upon which has the greater hydraulic pressure. The greater of the two hydraulic pressures in lines 26 or 106 is selected by shuttle valve 108, and conveyed through brake actuator pressure line 110 to brake assembly 54.

As shown in FIG. 3, two wheels 30 are rotatably mounted on axles 32 of a wheel truck 114. Wheel truck 114 is connected to a landing gear strut 112. Both wheels 30 have similar brake assemblies 54 and 55, each including a plurality of brake cylinders 28; however, each of wheels 30 are separately provided with hydraulic pressure through brake actuator pressure lines 110 and 111, respectively. It will be apparent that each wheel 30 has a separate torque control associated with it. Accordingly, torque reaction arms 36 extend from each of brake assemblies 54 and 55 to fixed support 38 disposed on landing gear strut 112, and each have a separate torque sensor 46 disposed thereon. The torque sensor 46 mounted on torque reaction arm 36 for the wheel shown on the right in FIG. 3 is connected by lead 48 to a torque control 120, while torque sensor 46 mounted on the torque reaction arm 36 associated with the left wheel 30 is connected by a lead 49 to a separate torque control (not shown). The hydraulic pressure developed in brake pressure line 82, as applied to antiskid valve 83, is sensed by pressure transducer 42 and input to torque control 120 over lead 44. In a similar fashion, a pressure transducer 122 produces a signal indicative of the hydraulic pressure in alternate brake pressure line 90, which is conveyed to torque control 120 through lead 124.

If the third embodiment 70 is used to retrofit an aircraft having an antiskid control 118 that is already installed, antiskid valves 83 and 102 would already be mounted on the aircraft and may be used by torque control 120 for modulating hydraulic pressure applied to actuate brake assembly 54 in a manner analogous to that used with servo valve 22 in the first and second embodiments 10 and 60. In the following discussion, it will be assumed that the torque control is retrofit, although it may be installed on a new aircraft, during fabrication of the aircraft.

The existing antiskid control 118 and torque control 120 are electrically connected in parallel by lead 52 to antiskid valve 83 and by lead 126 to the alternate antiskid valve 102. Isolation diodes 128 and 130 are provided on the outputs of each of the torque control 120 and the antiskid control 118, respectively, and prevent the signals produced by each of these units from being fed back into the other. Furthermore, since the antiskid valves 83 and 102 respond to the magnitude of the current input to them, they react to whichever source, i.e., torque control 120 or antiskid control 118, produces the greater output current in modulating the pressure of the hydraulic fluid applied to actuate brake assembly 54.

Antiskid control 118 is responsive to the relative speed of each of the wheels of the aircraft during braking, and is thereby operative to sense if one or more of the wheels is rotating at a speed which would likely be indicative of an impending wheel lock-up condition wherein the wheels are about to skid on the pavement. A wheel speed sensor (not shown) is provided at each axle 32 to provide a signal indicative of the speed of the wheel mounted on that axle, and that signal is conveyed to antiskid control 118 over leads 116. However, operation of torque control 120 is independent of wheel speed.

Since the output of antiskid control 118 reduces the pressure in hydraulic brake actuator lines 26 and 106 in response to an impending wheel lock-up condition, the output signal produced by torque control 120 does not affect the reduction of hydraulic fluid pressure by antiskid control 118 unless torque control 120 calls for a greater reduction in hydraulic fluid pressure than is required by the antiskid control. The third embodiment 70 of the brake torque control system may thus be easily retrofit to an aircraft having an existing antiskid control system without significant modification of the existing braking system, using the installed antiskid valves 83 and 102 both for skid control and for controlling brake torque.

Figure 4:
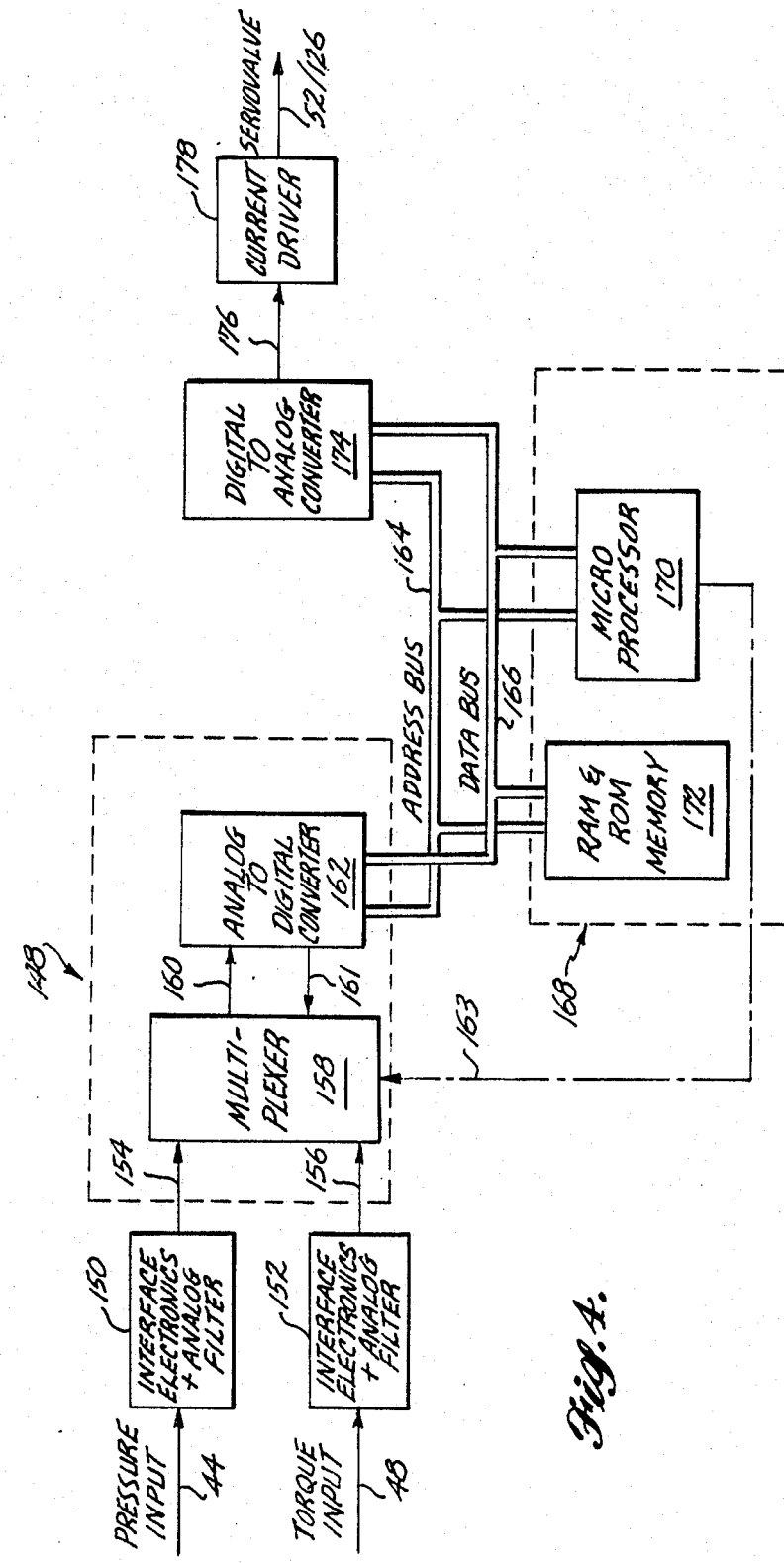
FIG. 4 is a block diagram showing the component parts of the brake torque control.

A simple block diagram illustrating the components of torque control 50 (or 120) is shown in FIG. 4. The electrical signal from pressure transducer 42 (or from load sensor 62) is input via lead 44 (or lead 64) to an interface electronics and analog filter circuit 150. Similarly, the electrical signal from torque sensor 46, which is indicative of the torque developed by brake assembly 54 is input via lead 48 to an interface electronics and analog filter circuit 152. The interface electronics and analog filter, circuits 150 and 152 scale the electrical signals from pressure transducer 42 and torque sensor 46 and filter out any noise produced by brake oscillation, or picked-up during transmission of the electrical signals to torque control 50 (or 120). The outputs of the interface electronics and analog filter circuits 150 and 152 are each applied via conductors 154 and 156 to an input of an analog-to-digital conversion system 148 comprising a multiplexer 158 and an analog-to-digital converter 162 connected to the output of multiplexer 158 via a conductor 160. Multiplexer 158 alternately selects one of its inputs 154 and 156 and applies the selected input to the analog-to-digital converter 162 in response to a signal input on line 161 from the analog-to-digital converter, or alternatively, a signal from a controller 168. The analog-to-digital converter 162 is connected by an Address Bus 164 and a Data Bus 166 to the controller 168, comprising a microprocessor 170 and a memory 172. Memory 172 includes a random access memory (RAM) and a read-only memory (ROM). The Address Bus 164 and Data Bus 166 are also connected to a digital-to-analog converter 174, having an output lead 176 connected to the input of a current driver 178. Since the servo valve 22 (or antiskid valves 83 and 102) responds to an electric current to modulate the pressure of hydraulic fluid, the variable voltage analog signal produced by digital-to-analog converter 174 must be converted to a corresponding electrical current, and amplified to produce an electrical current of sufficient magnitude to control the servo valve (or antiskid valves). Current driver 178 carries out this function and may comprise one or more integrated circuits or discrete component transistor amplifier circuits.

The algorithm for controlling the braking torque developed by brake assembly 54 as a function of the force applied to actuate the brakes is stored in the ROM portion of memory 172, as a machine language program suitable for implementation by microprocessor 170. In the preferred embodiment, microprocessor 170 comprises a conventional 16-bit microprocessor (an Intel Model 8086), which produces a binary output signal conveyed by Data Bus 166 to digital-to-analog converter 174. Other suitable microprocessors may be used and may include both ROM and RAM as integral elements. The binary signal is converted to an analog signal by digital-to-analog converter 174 and is used as an input to current driver 178 to produce the output control signal needed for modulating servo valve 22 (or antiskid valves 83 and 102).

Figure 5:
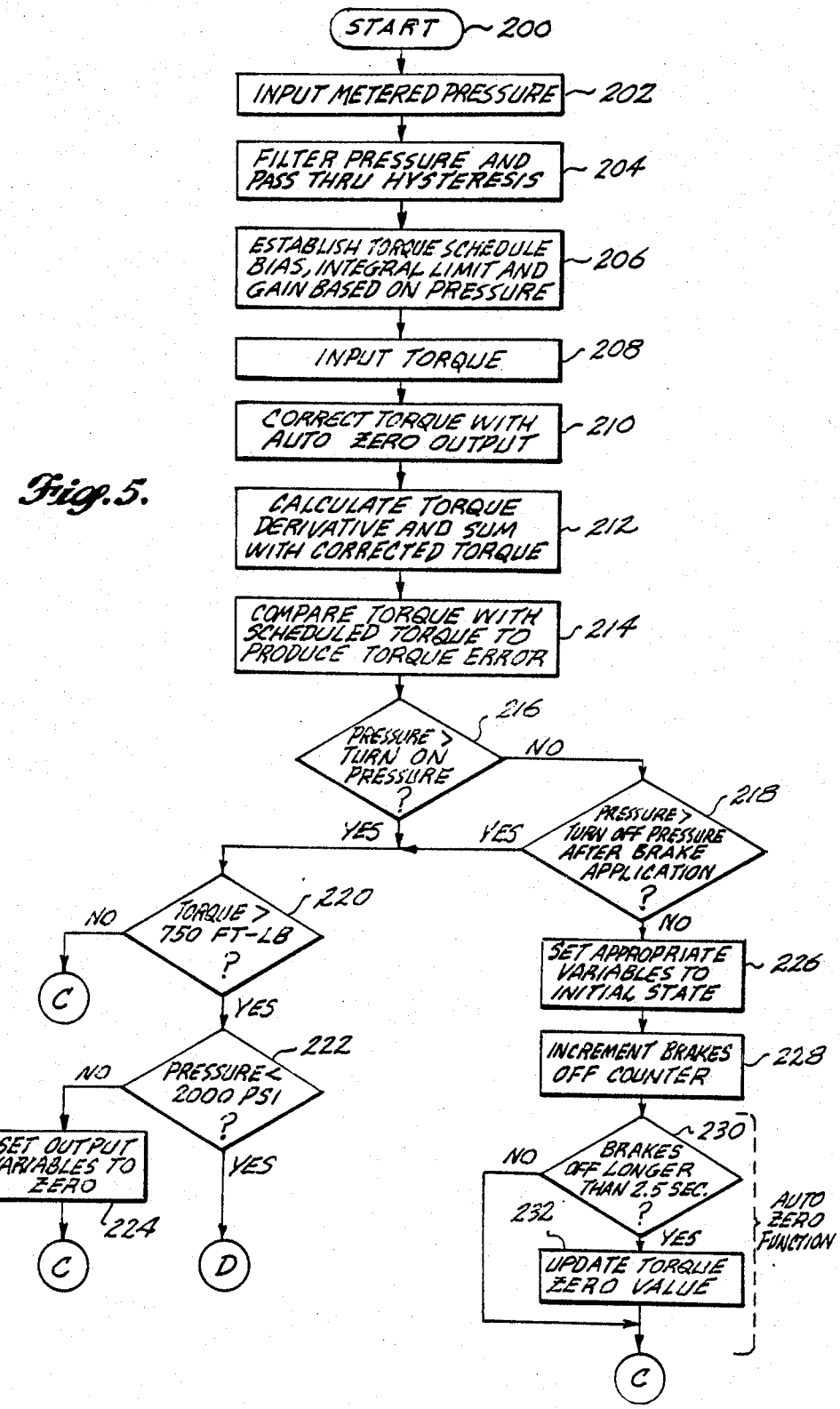
FIG. 5 is a first portion of a flowchart illustrating the control algorithm used by the present invention for controlling braking torque.
Figure 6:
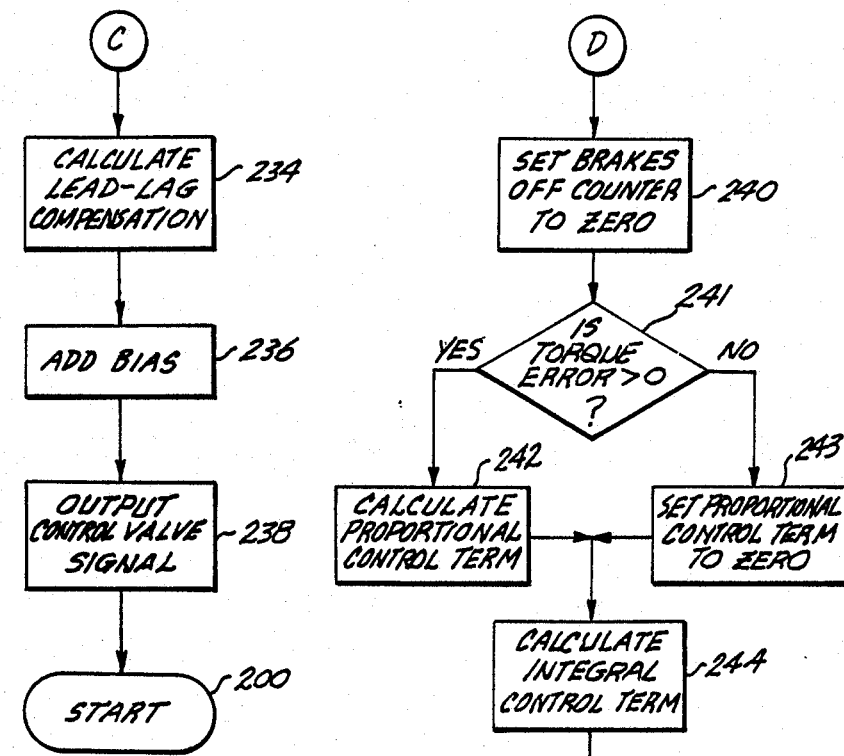
FIG. 6 is a continuation of the flowchart of FIG. 5.
Figure 7:
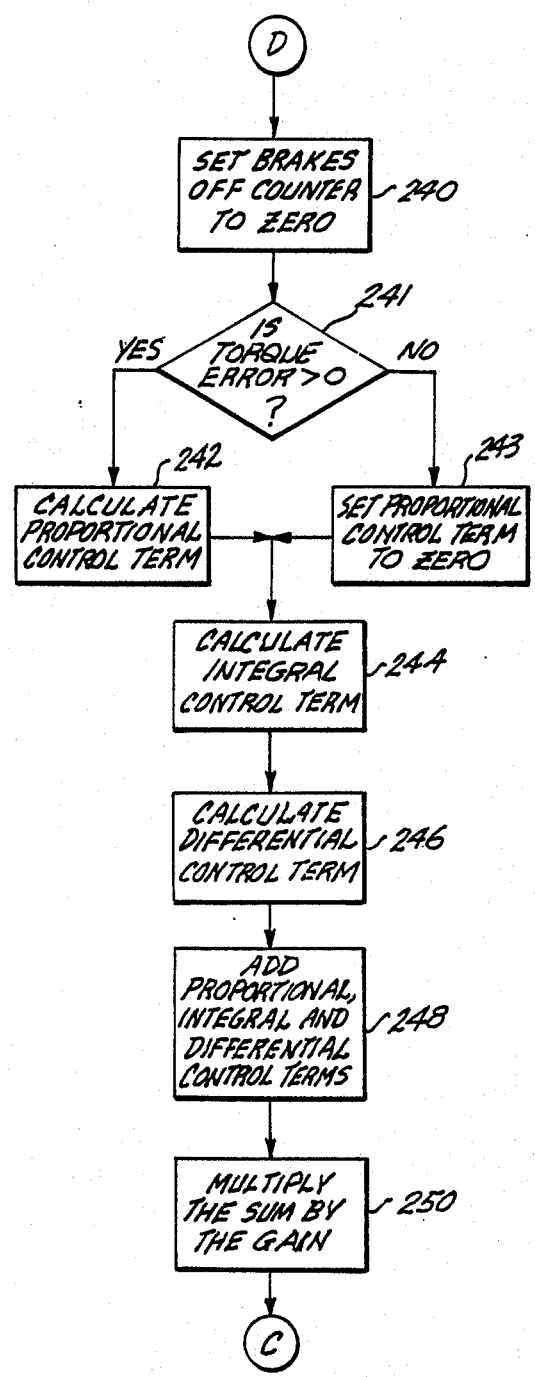
FIG. 7 is a continuation of the flowchart of FIGS. 5 and 6.

FIGS. 5-7 illustrate in a flowchart the control algorithm implemented by microprocessor 170 in controlling the torque developed by brake assembly 54. The flowchart starts at block 200. In the following block 202, the digital signal indicative of the pressure in hydraulic line 20 is input to microprocessor 170. In block 204, the digital signal representing pressure is processed by applying the software equivalent of a second order low-pass filter having an upper cut-off frequency of 1 Hertz. After it is thus filtered, the signal is subject to a 90 psi pass-through hysteresis check. The term "pass-through hysteresis" refers to the use of an input check function which ignores a change in the pressure monitored by pressure transducer 42 if opposite in sign from a previous change, unless the present change exceeds a predetermined increment, i.e., 90 psi, in the preferred embodiment of the invention. For example, if the pressure of the hydraulic fluid has been increasing and has attained a value of 350 psi, it must decrease by at least 90 psi before CPU 170 will use a pressure less than 350 psi in subsequent calculations involving pressure. Conversely, if the pressure has been decreasing, it must increase by at least 90 psi over the value last used by CPU 170, in order for the higher value to be used. The purpose of providing the 1 Hertz low-pass filter and the pass-through hysteresis is to eliminate oscillations in the value used for pressure and to improve the stability of the torque control algorithm.

Look-up tables stored in ROM are used by microprocessor 170 to establish a torque schedule, a bias value, an integral negative limit, and a gain value—all functions of the pressure sensed by pressure transducer 42. Thus, for example, for each successive incremental range of pressure, a particular maximum torque value is assigned in a look-up table stored in the ROM of memory 172. Similarly, in block 206, bias values, integral negative limits and gain values are determined based upon the particular incremental range of pressure associated with each of the values in their respective look-up tables.

Proceeding on to block 208, the digital signal corresponding to brake torque produced by torque sensor 46, is input to microprocessor 170. An auto zero function is provided for this signal, which in block 210 is used for correcting the digital value of torque to remove errors which may arise from temperature variations or drift in torque sensor 46. This is accomplished by providing a slow rate filter or low frequency filter in software, with accompanying track-and-hold logic.

Subsequently, in block 212, the derivative of the torque is determined and summed with the zero corrected torque value. The torque derivative is determined by applying a transfer function:

$$\frac{K_{DF} \cdot S}{1 + \tau_{DF} \cdot S} \quad (1)$$

where S represents the LaPlacian operator, $K_{DF}$ is a gain constant, and $\tau_{DF}$ is a time constant, approximately equal to 0.5 seconds. The rate of change of the torque is used to improve the reaction of the system. A rapid increase in torque causes the torque controller to anticipate an excessive torque level before it occurs, thus preventing it from occurring.

As shown in block 214, the sum of the torque derivative and corrected torque are compared with the scheduled maximum torque determined as a function of the applied brake pressure in block 206, to calculate the torque error. In determining the torque error, the scheduled maximum torque from the look-up table is subtracted from the sum of the zero corrected torque and the torque derivative.

In block 216, microprocessor 170 determines if the pressure sensed by pressure transducer 42 exceeds a minimum "turn on pressure" (270 psi in the preferred embodiment) which is a pressure just below that necessary to cause the brake pads to contact the brake disc rotor. If not, in block 218, the control algorithm next determines if the pressure exceeds a "turn off pressure", but only if the brakes have already been applied, i.e., whether following application of the brakes to slow wheel 30, the brake pressure has fallen below the turn off pressure necessary to keep the brake pads engaged with the rotor. In the preferred embodiment, the turn off pressure is approximately 250 psi. If the answer is again negative, it is an indication that the brakes are released. If either the pressure in the hydraulic line 20 is greater than the turn on pressure in block 216 or is greater than the turn off pressure after the brakes have been applied in block 218, the control logic proceeds to block 226 wherein variables used by the control are set to their initial state. In this step, a bias term and the output of an integral calculation (both described hereinbelow) are set to zero. Thereafter, in block 228, a counter used to determine a minimum interval that the brakes have been released is incremented. In block 230, a check is made to determine if the time interval during which the brakes have been released, represented by the Brakes Off Counter of block 228, exceeds 2.5 seconds. If the answer is affirmative, in block 232, the zero shift correction value for the torque developed by the brakes is updated so that errors in the sensed brake torque due to zero shift or drift in torque sensor 46 can be compensated as described above, relative to block 206. Thereafter, control logic continues to the top of FIG. 6, as indicated by reference letter C.

Assuming that the brake disks are in contact with the brake rotors as indicated by an affirmative response to either block 216 or 218, the control algorithm checks to see if the torque developed by brake assembly 54 is greater than 750 ft-lbs and, if not, proceeds to the top of FIG. 6, again continuing at reference letter C. The torque value 750 ft-lbs is a minimum torque at which modulation of the brake pressure may occur. If the answer to the question in block 220 is affirmative, however, in block 222, the control algorithm determines if the pressure is less than 2000 psi. This check is made to ascertain whether the pilot is trying to apply full braking force in an emergency braking situation, in which case, it is necessary to override the normal torque control function of torque control 50 (or 120). A negative response to block 222 indicates the emergency braking condition is in effect, allowing control logic to proceed to block 224 where the output variables are all set to zero, thereby overriding the torque control. This occurs as the control logic proceeds to the top of the flowchart shown in FIG. 6, as indicated by reference letter C.

Under the more typical braking condition where an emergency condition does not exist, the pressure in the hydraulic brake line will be less than 2000 psi, providing an affirmative response to block 222, so that the program logic continues to the top of the flow chart in FIG. 7, as indicated by reference letter D. It will be apparent that the algorithm reaches this point only if the torque is greater than 750 and less than 2000 ft-lbs.

With reference to FIG. 7, starting at letter D, the control logic proceeds to set the Brakes Off-Counter to zero in block 240, since the brakes are clearly in use at this point in the algorithm. The torque error determined in block 214 is then used in calculating a nonzero proportional control term in block 242, but only if the torque error is positive in block 241, i.e., if the corrected brake torque is greater than the scheduled torque. Otherwise, in block 243, the proportion term is set equal to zero.

In block 244, the torque error is used to calculate an integral control term between upper and lower limits, the upper limit being fixed at a predetermined value and the lower limit being a function of the pressure of hydraulic fluid as sensed by pressure transducer 42 and determined from a look-up table as previously described with reference to block 206. In calculating the integral control term, the LaPlacian operator 1/S is used to carry out the integration.

Proceeding to block 246, a differential control term is calculated by applying the LaPlacian transform:

$$\frac{K_D \cdot S}{1 + \tau_D \cdot S} \quad (2)$$

wherein S is the LaPlacian operator, $K_D$ is a constant and $\tau_D$ is a filter time constant approximately equal to 0.5 seconds. In block 248, the proportional, integral and differential control terms are added together, and in block 250, the sum is multiplied by a gain value determined from a look-up table as a function of the hydraulic fluid pressure sensed by pressure transducer 42, as described above with respect to block 206. The product is a value for the intermediate output control signal. The algorithm then proceeds to the top of FIG. 6, reference letter C.

Proceeding to FIG. 6, in block 234, a lead-lag compensation is calculated for application to the intermediate output signal. The lead-lag compensation is used to improve the frequency response characteristics of the control algorithm, extending the frequency response of the control system beyond that of the brake hydraulic system, and allowing other gain settings in the system to be increased while maintaining stable operation. The lead-lag compensation implements the transfer function:

$$\frac{1 + 2\xi_1 S/\omega_1 + S^2/\omega_1^2}{1 + 2\xi_2 S/\omega_2 + S^2/\omega_2^2} \quad (3)$$

where $\xi_1$ and $\xi_2$ are damping factors, $\omega_1$ is a filter break point set approximately equal to the resonant frequency of the hydraulic system, $\omega_2$ is a filter break point selected to be higher than $\omega_1$ so that the frequency response of the filter rolls off beyond the range of interest, and S is the LaPlacian operator. Calculation of the lead-lag compensation involves summation of five terms, wherein the values of previous output control signals are multiplied by selected constants and added to the present intermediate output control signal. Lead-lag compensation is calculated even though the intermediate output control signal is at zero, indicating no modulation of the pressure of hydraulic fluid is required, to ensure that each of the terms used in successive lead-lag compensation calculations are properly zeroed. Following several reiterations through the control algorithm, the lead-lag compensation finally decreases to zero if the intermediate output control signal remains at zero.

Continuing on with block 236, a bias correction determined from a lookup table (in block 206) is added to the intermediate output control signal, compensating for the design of the antiskid valves 83 and 102 which require nearly maximum current to effect pressure reduction at metered pressures typical of taxi braking. The bias term thus matches the output control signal produced by torque control 120 to the characteristics of antiskid valves 83 and 102. Since the bias is set to zero in block 232 after the brakes are released, i.e., once the brake pressure has fallen below the turn-off value (250 psi), the bias term does not present any contribution unless the brake assembly 54 is actually slowing wheel 30. In control block 238, the control signal is output from torque control 50 (or 120) through lead 52 (and 126). Control logic then returns to block 200, recycling through the flowchart as previously described hereinabove.

Although the flowchart has been disclosed with respect to use of the pressure sensed by pressure transducer 42, it will be apparent that the mechanical load sensed by load sensor 62 could be used in an equivalent manner by the torque control to determine the torque control signal output over leads 52 and 126 to the antiskid valves 83/102.

The above-described torque control 50 (or 120) is applicable to any type of braking system; however, it is particularly appropriate for use with carbon brakes, which are subject to high and unpredictable torque. Since the torque control is applied separately to each wheel of the aircraft, variations in the braking torque exhibited by each of the brake assemblies 54 associated with each wheel are substantially minimized in terms of their effect upon the ability of the pilot to brake the aircraft smoothly and to retain control at any speed, both during landing and during taxiing of the aircraft along the runway and on the apron. Since torque control unit 120 may be applied to an aircraft having an existing antiskid control unit 118 and may use the already installed antiskid valves 83 and 102, it can be retrofit to an aircraft with little modification to the installed system. As noted with respect to flowchart block 222, the torque control algorithm automatically prevents any modulation of braking pressure if the pressure applied to actuate the brakes exceeds 2000 psi, thus insuring that the pilot may stop the plane in an emergency without concern about interference from the torque control system.

While the preferred embodiments of the invention use a microprocessor 170 for torque control units 50 and 120, it will be readily understood that the control algorithms explained herein may also be implemented using discrete electronic components and may be implemented in analog circuitry instead of digitally.

The present invention has been disclosed with respect to several preferred embodiments; however, further modifications thereto will be apparent to those skilled in the art within the scope of the claims which follow. Accordingly, it is not intended that the scope of the invention be limited by the disclosure, but instead that it be determined by reference to the claims which follow hereinbelow.

The embodiments of the invention in which an exclusive property or privilege is claimed are defined as follows:

1. A system for controlling a torque developed by a fluid pressure activated brake as it slows a rolling wheel, comprising:
   (a) means for producing a signal indicative of the magnitude of a force applied to actuate the brake;
   (b) means for sensing the torque developed by the brake as it slows the rolling wheel and for producing a signal indicative of that torque;
   (c) means for reducing the pressure of the fluid actuating the brake independently of the wheel's rolling speed and in response to a control signal, the pressure reducing means being disposed so as not to affect the means for producing a signal indicative of the magnitude of the force applied to actuate the brake; and
   (d) control means, connected to receive the signal indicative of the magnitude of the force applied to actuate the brake and the signal indicative of the torque developed by the brake, for producing the control signal to reduce the fluid pressure actuating the brake if the torque developed by the brake exceeds a value determined as a function of the magnitude of the force applied to actuate the brake.

2. The system of claim 1 wherein the means for producing a signal indicative of the magnitude of the force applied to actuate the brake comprise a pressure transducer disposed so as to sense fluid pressure upstream of the means for reducing the pressure.

3. The system of claim 1 wherein the means for producing a signal indicative of the magnitude of the force applied to actuate the brake comprise a load sensor disposed so as to sense a force applied to a fluid metering valve through which pressurized fluid is supplied to actuate the brake, upstream of the means for reducing pressure.

4. The system of claim 1 wherein the means for sensing torque comprise a strain gauge disposed on a link that connects the brake to an adjacent fixed support.

5. The system of claim 1 wherein the means for reducing pressure are connected in parallel to an antiskid control and are operative to reduce the pressure of fluid actuating the brake in response to a control signal produced by the antiskid control.

6. The system of claim 1 wherein the control means determine a scheduled torque as a function of the force applied to actuate the brake, and then determine the difference between the scheduled torque and the torque developed by the brake.

7. The system of claim 6 wherein the control means determines a rate of change of the torque, adds it to the torque developed by the brake, and then determines the difference between the scheduled torque and the sum of the torque and its rate of change to anticipate an excessive torque.

8. The system of claim 6 wherein the control means compute the sum of an integral, a proportional gain, and a differential computation, each computation being performed on the difference between the scheduled torque and the torque developed by the brake, and wherein the sum determines the control signal.

9. The system of claim 8 wherein the sum is multiplied by a gain factor that is a function of the magnitude of the force applied to actuate the brake.

10. The system of claim 8 wherein the control signal produced by the control means includes lead-lag compensation to extend the frequency response of the system beyond that of the fluid pressure actuated brake.

11. The system of claim 8 wherein the control signal produced by the control means includes an added bias term that is determined as a function of the magnitude of the force applied to actuate the brake.

12. The system of claim 1 wherein the control means include means for automatically zeroing the signal indicative of the torque developed by the brake.

13. A system for controlling a torque developed by a fluid pressure actuated brake as it slows a rolling wheel that is adapted to operate in parallel with an antiskid brake control system, comprising:
(a) means for producing a signal indicative of the magnitude of an operator applied braking force;
(b) means for sensing the torque developed by the brake as it slows the rolling wheel and for producing a signal indicative of that torque;
(c) pressure reducing means associated with the antiskid brake control system, for reducing the pressure of the fluid actuating the brake in response to a control signal, the antiskid brake control system producing a first such control signal as a function of wheel speed to prevent the wheel locking and skidding; and
(d) control means, connected to and responsive to both the signal indicative of the magnitude of the operator applied braking force and the signal indicative of the torque developed by the brake, for producing a second control signal independent of rolling wheel speed, that is input to the pressure reducing means in parallel with the first control signal, to reduce the fluid pressure actuating the brake if the torque developed by the brake exceeds a value determined as a function of the magnitude of the operator applied braking force, the pressure reducing means responding to the greater of the first and second control signals to reduce the pressure of the fluid actuating the brake accordingly.

14. The system of claim 13 wherein the means for producing a signal indicative of the magnitude of an operator applied braking force comprise a pressure transducer disposed so as to sense fluid pressure upstream of the means for reducing the pressure.

15. The system of claim 13 wherein the means for producing a signal indicative of the magnitude of an operator applied braking force comprise a load sensor disposed so as to sense a force applied to a fluid metering valve through which pressurized fluid is supplied to actuate the brake, upstream of the means for reducing pressure.

16. The system of claim 13 wherein the means for sensing torque comprise a strain gauge disposed on a link that connects the brake to an adjacent fixed support.

17. The system of claim 13 wherein the pressure reducing means comprise a valve sensitive to an electrical current, the magnitude of the current controlling the extent of pressure reduction, the first and second control signals comprising electrical currents for controlling the valve.

18. The system of claim 13 wherein the control means determines a rate of change of the torque in producing the second control signal, the rate of change of the torque serving to anticipate rapid changes in torque to improve system response.

19. The system of claim 13 wherein the control means are operative to determine an error for the torque developed by the brake relative to the determined value of torque, and wherein the second signal includes a proportional term computed by the control means as a function of the torque error, if the torque developed by the brake exceeds the determined value of torque.

20. The system of claim 19 wherein the control means further comprise means for computing an integral term and a derivative term as functions of the torque error, which are added to the proportional term to determine the second control signal.

21. The system of claim 13 wherein the second control signal includes lead-lag compensation to extend the frequency response of the system beyond that of the fluid pressure actuated brake.

22. The system of claim 13 wherein the control means are operative to add a bias signal in producing the second control signal, to match a characteristic of the antiskid brake control system, the bias signal being determined as a function of the magnitude of the operator applied braking force.

23. The system of claim 13 wherein the control means are operative to inhibit the production of the second control signal if the magnitude of the operator applied braking force exceeds a predetermined limit.

24. The system of claim 13 wherein the control means are operative to inhibit the production of the second control signal if the magnitude of the operator applied braking force is less than a predetermined minimum limit.

25. A system for controlling a torque developed by a fluid pressure actuated brake applied to slow a rolling wheel, the system comprising:
(a) operator controlled means for developing a fluid pressure in a brake line connected to actuate the brake;
(b) means for sensing the fluid pressure developed in the brake line by the operator controlled means;
(c) means for sensing the torque developed by the brake as it reacts against a supporting member to slow the speed of the rolling wheel;
(d) a valve disposed in the brake line, intermediate the means for sensing the fluid pressure and the brake, and operative to reduce the pressure of fluid applied to actuate the brake;
(e) valve control means connected to the means for sensing pressure and the means for sensing torque for controlling the valve, the valve control means including a central processing unit having a memory in which is stored both a control program and a schedule of torque values that are accessed by the central processing unit in accordance with the control program, each scheduled torque value corresponding to a predetermined range of fluid pressure in the brake line, the control means being operative to cause the valve to reduce the fluid pressure applied to the brake if the torque developed by the brake exceeds the scheduled torque corresponding to the fluid pressure developed in the brake line by the operator controlled means, independent of the rolling speed of the wheel.

26. The system of claim 25 wherein the central processing unit computes a torque error that is equal to the difference between the sum of the torque developed by the brake and its derivative, and the scheduled torque.

27. The system of claim 26 wherein the central processing unit computes a control signal that includes proportional, integral and differential components, the control signal being used by the central processing unit to effect control of the valve.

28. The system of claim 27 wherein the control signal includes a bias component to compensate for a characteristic of the valve and a lead-lag component to improve the frequency response of the system.

29. A method for controlling a torque developed by a fluid pressure actuated brake as it slows a rolling wheel, comprising the steps of:
 (a) producing a signal indicative of the magnitude of an operator applied braking force;
 (b) sensing the torque developed by the brake as it slows the rolling wheel and producing a signal indicative of that torque; and
 (c) independent of the wheel rolling speed, reducing the fluid pressure actuating the brake if the torque developed by the brake exceeds a value determined as a function of the magnitude of the operator applied braking force.

30. The method of claim 29 wherein the step of producing the signal indicative of the magnitude of the operator applied braking force comprises the step of sensing a fluid pressure directly controlled by the operator applied braking force.

31. The method of claim 29 wherein the step of producing the signal indicative of the magnitude of the operator applied braking force comprises the step of sensing the load applied by the operator to directly control braking of the wheel.

32. The method of claim 29 further comprising the step of determining a torque error equal to a difference between the torque developed by the brake and the determined value of torque.

33. The method of claim 32 wherein the step of computing the torque error includes the step of computing the derivative of the torque and adding it to the torque error, and wherein the step of reducing the fluid pressure includes computing a control signal that is a function of the torque error and which is used to effect reduction of the fluid pressure actuating the brake.

34. The method of claim 33 wherein the control signal includes a proportional, an integral, and a differential component.

35. The method of claim 33 wherein the control signal includes a bias component and a lead-lag component.

* * * * *